(12) United States Patent
Skuci et al.

(10) Patent No.: US 11,795,729 B2
(45) Date of Patent: Oct. 24, 2023

(54) HANDLE FOR A COMPARTMENT OF A LOW, MEDIUM OR HIGH VOLTAGE SWITCHGEAR

(71) Applicant: ABB Schweiz AG, Baden (CH)

(72) Inventors: Michal Skuci, Brno (CZ); Josef Cernohous, Jamne nad Orlici (CZ)

(73) Assignee: ABB Schweiz AG, Baden (CH)

( * ) Notice: Subject to any disclaimer, the term of this patent is extended or adjusted under 35 U.S.C. 154(b) by 179 days.

(21) Appl. No.: 17/388,031

(22) Filed: Jul. 29, 2021

(65) Prior Publication Data
US 2022/0049523 A1   Feb. 17, 2022

(30) Foreign Application Priority Data
Aug. 12, 2020  (EP) .................... 20 190 730

(51) Int. Cl.
| | |
|---|---|
| *E05B 13/00* | (2006.01) |
| *E05B 5/02* | (2006.01) |
| *E05B 1/06* | (2006.01) |
| *E05C 1/06* | (2006.01) |
| *H02B 1/30* | (2006.01) |
| *H02B 1/06* | (2006.01) |

(Continued)

(52) U.S. Cl.
CPC ............ *E05B 13/002* (2013.01); *E05B 5/003* (2013.01); *E05C 1/06* (2013.01); *H02B 1/06* (2013.01); *H02B 1/30* (2013.01); *H02B 1/306* (2013.01); *H02B 1/44* (2013.01); *E05B 7/00* (2013.01)

(58) Field of Classification Search
CPC .......... E05B 13/002; E05B 5/003; E05B 7/00; E05B 2047/0067; E05B 1/0092; E05B 17/22; E05C 1/06; H02B 1/306; H02B 11/133; H01H 9/22
See application file for complete search history.

(56) References Cited

U.S. PATENT DOCUMENTS

| | | | |
|---|---|---|---|
| 6,053,018 A | 4/2000 | Ramsauer | |
| 8,176,758 B2 * | 5/2012 | Ramsauer ............. | E05B 1/0092 70/423 |

(Continued)

FOREIGN PATENT DOCUMENTS

| | | |
|---|---|---|
| BE | 535860 A | 3/1955 |
| DE | 29507654 U1 | 9/1996 |

(Continued)

*Primary Examiner* — Kristina R Fulton
*Assistant Examiner* — Thomas L Neubauer
(74) *Attorney, Agent, or Firm* — Leydig, Voit & Mayer, Ltd.

(57) ABSTRACT

A handle for a compartment of a low, medium or high voltage switchgear includes: a body part; a hand grasping part; and a lock. The handle is movable from a closed position to an open position. When the handle is in the closed position, the handle is not useable to open a door of a compartment of the switchgear. When the handle is in the open position, the handle is useable to open the door of the compartment of the switchgear. In the open position, the hand grasping part is positioned so as to be graspable by a human user. In the closed position, a transition of an active element in the compartment of the switchgear from a quiescent state to an active or potentially active state activates the lock. Activation of the lock stops the handle from moving from the closed position to the open position.

12 Claims, 4 Drawing Sheets

(51) Int. Cl.
*H02B 1/44* (2006.01)
*E05B 7/00* (2006.01)

(56) References Cited

U.S. PATENT DOCUMENTS

| 11,222,758 | B2* | 1/2022 | Soldan | H01H 19/14 |
| 2018/0152007 | A1* | 5/2018 | Kroushl | H02B 1/306 |

FOREIGN PATENT DOCUMENTS

| EP | 2230734 A1 | 9/2010 |
| EP | 3016223 A1 | 5/2016 |

* cited by examiner

HANDLE FOR A COMPARTMENT OF A LOW, MEDIUM OR HIGH VOLTAGE SWITCHGEAR

CROSS-REFERENCE TO PRIOR APPLICATION

Priority is claimed to European Patent Application No. EP 20 190 730.0, filed on Aug. 12, 2020, the entire disclosure of which is hereby incorporated by reference herein.

FIELD

The present invention relates to handles for a door of a compartment of a low, medium or high voltage switchgear, and to low, medium or high voltage switchgears.

BACKGROUND

The operation of low, medium and high voltage switchgear has to follow certain rules so that the safety of both the device and the operator is secured. This often involves the use of interlocks.

Interlocks can operate in mechanical, an electrical or in a combined mechanical and electrical way. Mechanical interlocks are often preferred, because they work without the need of electrical power and their status can easily be overviewed by an operator.

However, there is the possibility for interlocks to be overridden, either through the use of excessive force being used by the operator or through the operator intentionally seeking to override the interlock.

There is a need to provide low. Medium and high voltage switchgear with improved interlock systems.

SUMMARY

In an embodiment, the present invention provides a handle for a compartment of a low, medium or high voltage switchgear, the handle comprising: a body part; a hand grasping part; and a lock, wherein the handle is configured to move from a closed position to an open position, wherein, when the handle is in the closed position, the handle is not useable to open a door of a compartment of the switchgear, wherein, when the handle is in the open position, the handle is useable to open the door of the compartment of the switchgear, wherein, in the open position, the hand grasping part is positioned so as to be graspable by a human user, wherein, in the closed position, a transition of an active element in the compartment of the switchgear from a quiescent state to an active or potentially active state is configured to activate the lock, and wherein activation of the lock is configured to stop the handle from moving from the closed position to the open position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
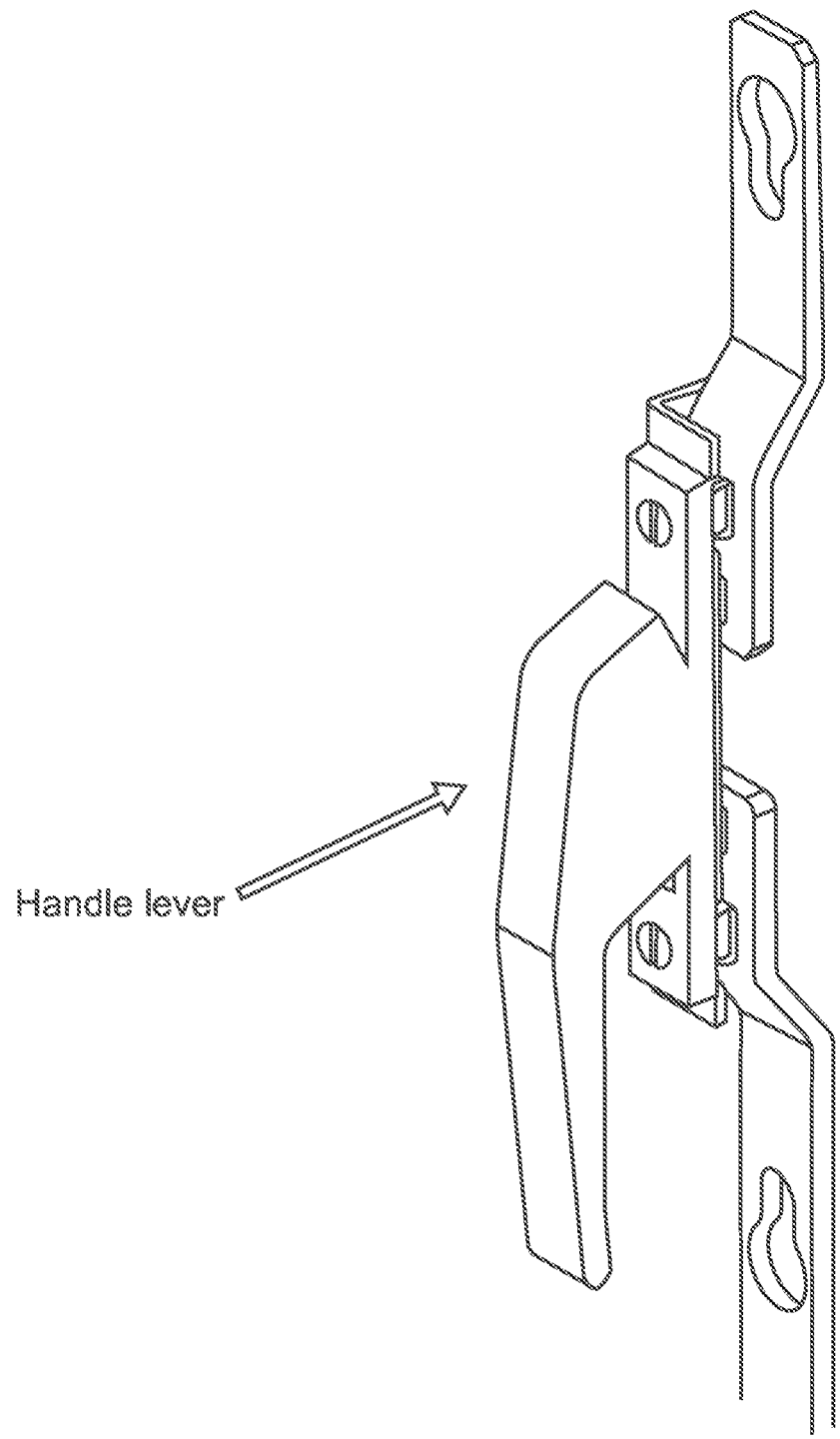
FIG. 1 shows an example of a known handle for a compartment of a switchgear.

In an embodiment, the present invention provides improved low, medium or high voltage switchgear interlock technology.

In a first aspect, there is provided a handle for a compartment of a low, medium or high voltage switchgear, the handle comprising:
a body part;
a hand grasping part;
a lock.

The handle is configured to move from a closed position to an open position. When the handle is in the closed position it is not useable to open a door of a compartment of a switchgear. When the handle is in the open position it is useable to open the door of the compartment of the switchgear. In the open position the hand grasping part is positioned such that a human user can grasp the hand grasping part. In the closed position a transition of an active element in the compartment of the switchgear from a quiescent state to an active or potentially active state is configured to activate the lock. Activation of the lock is configured to stop the handle from moving from the closed position to the open position.

Thus for example, the handle can be part of an interlock system of the switchgear, where for example the active element can be a circuit breaker (or earthing switch). Then when the handle is in the closed configuration, a movement of the circuit breaker from for example a racked out configuration to a racked in configuration (into a service position), where it can then potentially be activated (or similarly movement of the earthing switch such that a compartment should not be opened), can be linked to a coupling system that engages with the lock to then lock the handle in the closed position. Thus, when the active element such as the circuit breaker (or earthing switch) could now potentially be activated, the handle cannot then be utilised to open the door to the compartment within which the circuit breaker (or earthing switch) is located.

In an example, in the closed position a transition of the active element of the switchgear from the active or potentially state to the quiescent state is configured to de-activate the lock. De-activation of the lock is configured to enable the handle to move from the closed position to the open position.

Thus when the handle is in the closed configuration, a movement of the circuit breaker from for example the racked in configuration to the racked out configuration, where it can then not be activated and is safe, can be linked to the coupling system that engages with the lock to then unlock the handle in order that it could be moved from the closed position to the open position. Thus, the handle can only be used to open the compartment within which the circuit breaker is located when the circuit breaker is in a safe configuration.

In an example, the handle comprises a status pin, and a movement of the handle from the closed position to the open position is configured to move the status pin to a first position.

In an example, movement of the status pin to the first position is configured to place the active element of the switchgear in the quiescent state.

In an example, wherein a movement of the handle from the open position to the closed position is configured to move the status pin to a second position.

In an example, movement of the status pin to the second position is configured to enable the active element of the switchgear to enter the active or potentially active state.

In an example, the handle comprises a slider that in a first position is configured to lock to a part of the switchgear when the door of the switchgear is fully closed. In the first position of the slider the status pin is able to move. In a second position of the slider the slider is configured to be unlocked from the part of the switchgear. In the second position of the slider the status pin is stopped from moving from the first position of the status pin. When the status pin is stopped from moving from the first position the handle is configured such that the handle cannot move from the open position to the closed position.

In an example, in the closed position the hand grasping part is positioned such that a human user cannot grasp the hand grasping part.

In an example, in the closed position the hand grasping part is positioned at least substantially within the body part.

In a second aspect, there is provided a low, medium or high voltage switchgear, the switchgear comprising:
a compartment;
a door;
a handle according to the first aspect; and
an active element.

The door permits access to the inside of the compartment. The handle is used to open and close the door. The active element is located in the compartment.

In a third aspect, there is provided a handle for a compartment of a low, medium or high voltage switchgear, the handle comprising:
a body part;
a hand grasping part; and
a status pin.

The handle is configured to move from a closed position to an open position. When the handle is in the closed position it is not useable to open a door of a compartment of a switchgear. When the handle is in the open position it is useable to open the door of the compartment of the switchgear. In the open position the hand grasping part is positioned such that a human user can grasp the hand grasping part. A movement of the handle from the closed position to the open position is configured to move the status pin to a first position. Movement of the status pin to the first position is configured to place an active element of the switchgear in a quiescent state.

Thus for example, the handle can be part of an interlock system of the switchgear, where for example the active element can be a circuit breaker. Then movement of the handle from the closed position to an open position, where the compartment within which the circuit breaker is located could then potentially be opened, moves status pin that can be linked to a coupling system that engages with the circuit breaker to put it into a quiescent or safe state, for example placing it in a locked configuration where the circuit breaker cannot be operated.

In an example, a movement of the handle from the open position to the closed position is configured to move the status pin to a second position. Movement of the status pin to the second position is configured to enable the active element of the switchgear to enter an active or potentially active state.

Therefore, moving the handle from the open position to the closed position, where the compartment of the switchgear cannot then be opened, leads to a movement of the status pin that as discussed above can be linked to a coupling system that engages with the circuit breaker to place the circuit breaker in an unlocked configuration, where it could potentially be activated.

In an example, the handle comprises a slider that in a first position is configured to lock to a part of the switchgear when the door of the switchgear is fully closed. In the first position of the slider the status pin is able to move. In a second position of the slider the slider is configured to be unlocked from the part of the switchgear. In the second position of the slider the status pin is stopped from moving from the first position. When the status pin is stopped from moving from the first position the handle is configured such that the handle cannot move from the open position to the closed position.

In an example, the handle comprises a lock, and when the handle is in the closed position a transition of the active element in the compartment of the switchgear from the quiescent state to an active or potentially active state is configured to activate the lock. Activation of the lock is configured to stop the handle from moving from the closed position to the open position.

In an example, when the handle is in the closed position a transition of the active element of the switchgear from the active or potentially state to the quiescent state is configured to de-activate the lock. De-activation of the lock is configured to enable the handle to move from the closed position to the open position.

In an example, when the handle is in the closed position the hand grasping part is positioned such that a human user cannot grasp the hand grasping part.

In an example, when the handle is in the closed position the hand grasping part is positioned at least substantially within the body part.

In a fourth aspect, there is provided a low, medium or high voltage switchgear, the switchgear comprising:
a compartment;
a door;
a handle according to the third aspect; and
an active element.

The door permits access to the inside of the compartment. The handle is used to open and close the door. The active element is located in the compartment.

The above aspects and examples will become apparent from and be elucidated with reference to the embodiments described hereinafter.

FIG. 1 shows a known handle, used with current switchgear. In current switchgear such a simple handle is used to only secure the door to a compartment. There is no indication about the status of the handle (no status about the door being properly secured) and the handle is always ready to grab and operate. This can lead to a scenarios when the door handle appears to be in a position indicating that the door handle is closed and that the door is securely closed. However, the handle may not be fully at its end position, which means that the sliders associated with the door are not fully in contact with door pins. Presently interlocking systems inside switchgear are designed only to watch the position of the door (and not the handle), and as such in this situation the switchgear could potentially be operated whilst the door to a compartment is not completely secured, which could lead to dangerous situation. Another situation is that when doors are closed and interlocked (where for example the vertical sliders are locked and the door cannot then be opened with the handle), service personal can consider that the door can be opened but think that the handle is just jammed, and will grab it and apply excessive force on the handle, which can damage and even break the handle.

The inventors realised that a new handle design could mitigate these issues, where the handle also becomes part of the interlock system itself.

Figure 2:
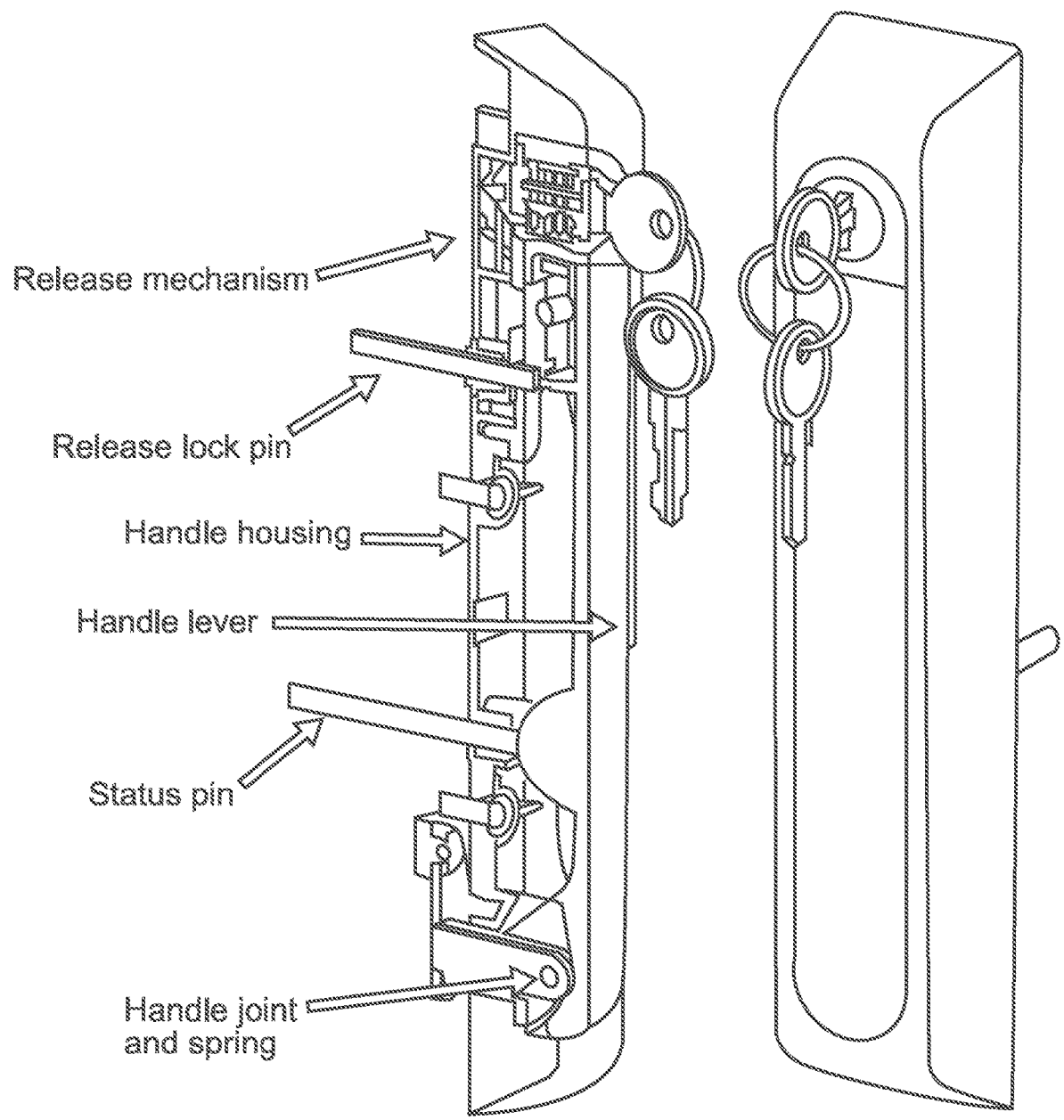
FIG. 2 shows an example of a new handle for a compartment of a switchgear.
Figure 3:
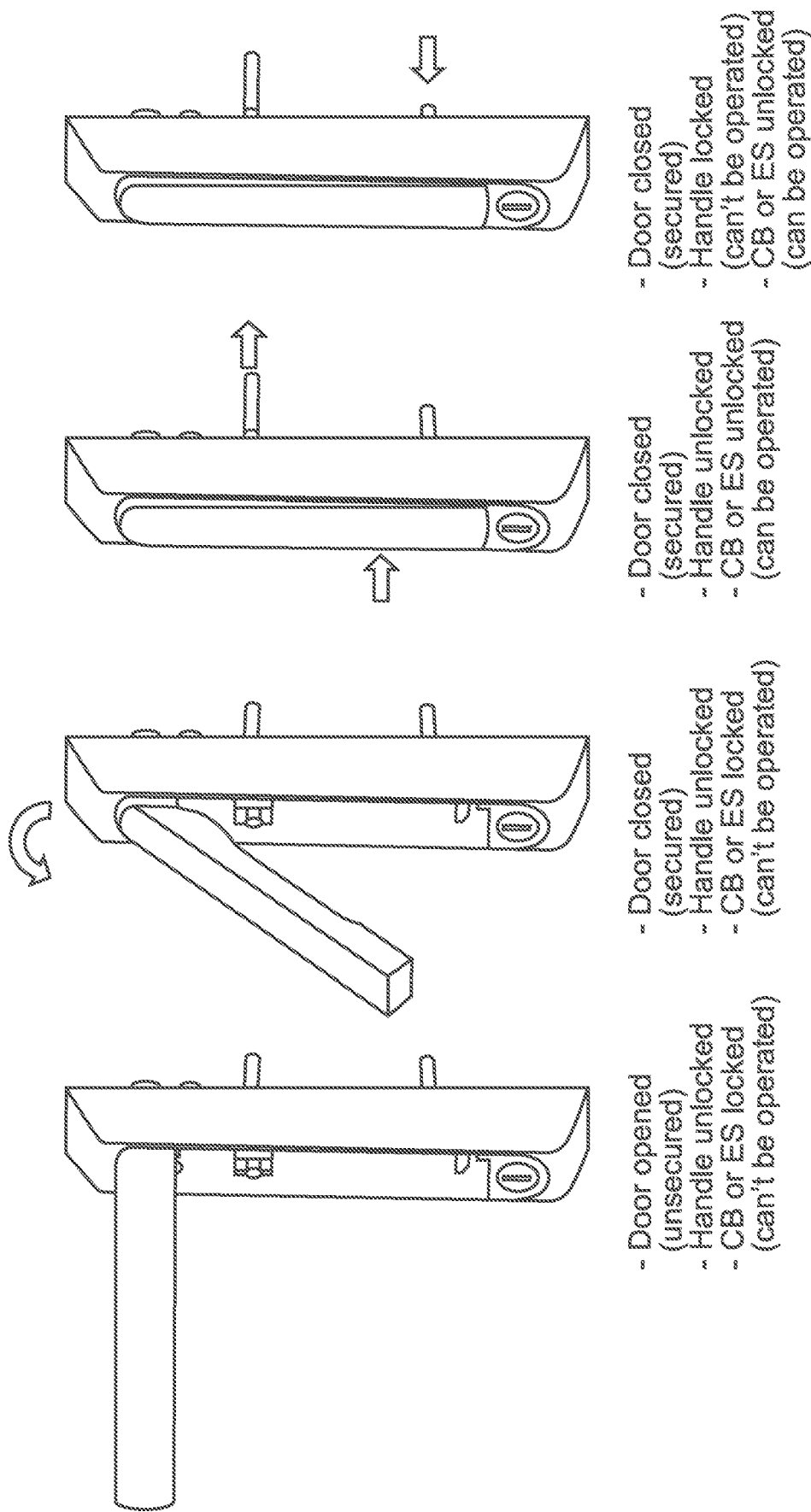
FIG. 3 shows an example of the new handle of FIG. 2 (rotated through 180 degrees) in various stages of operation.
Figure 4:
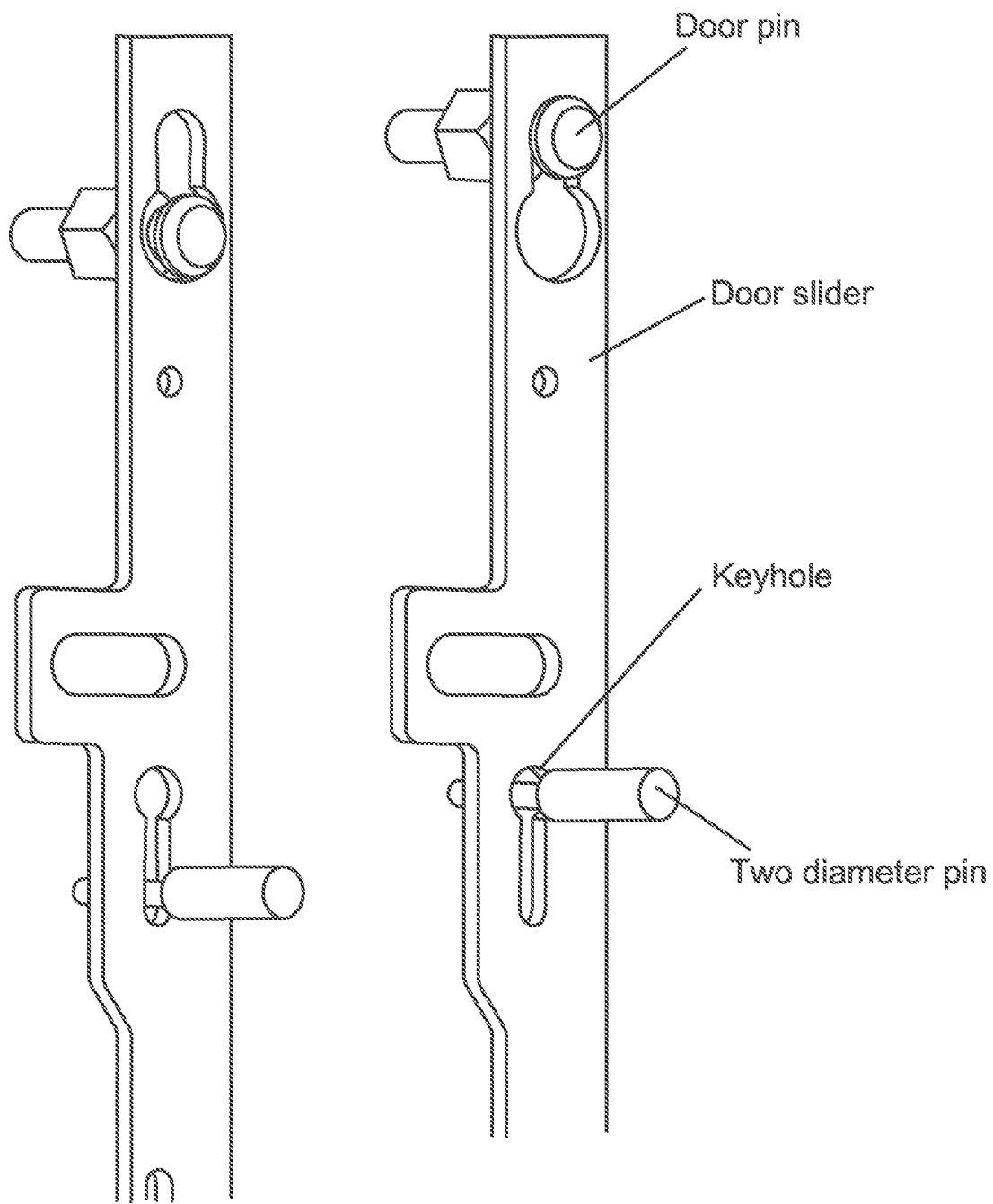
FIG. 4 shows an example of a slider of the new door handle of FIGS. 2-3.

The new handle is described with respect to FIGS. 2-4.

An example of the new handle for a compartment of a low, medium or high voltage switchgear is described below. The handle is described with respect to a switchgear, but finds utility in other situations such as for control gear. The handle comprises a body part, a hand grasping part, and a lock. The handle is configured to move from a closed position to an open position. When the handle is in the closed position it is not useable to open a door of a compartment of a switchgear. When the handle is in the open position it is useable to open the door of the compartment of the switchgear. In the open position the hand grasping part is positioned such that a human user can grasp the hand grasping part. In the closed position a transition of an active element in the compartment of the switchgear from a quiescent state to an active or potentially active state is configured to activate the lock. Activation of the lock is configured to stop the handle from moving from the closed position to the open position.

Thus, the lock as described above is not a normal lock of the handle that is key operated, as shown for example in FIG. 2 where a key is shown in the normal lock, rather the new lock can be that as shown in FIG. 2 and be activated by the release lock pin through a change of state of an active element within the compartment of the switchgear. The release lock pin (the lock) is also shown in FIG. 3 as the bottom pin, and the right hand image of FIG. 3 shows that a transition of active element such as a circuit breaker or earthing switch to a state where it is potentially dangerous, has been coupled to a coupling system that has led to the release lock pin being pushed into the body part of the handle and in doing so locking the handle in order that the handle cannot move from the closed position to the open position. In this particular example, the hand grasping part is locked into the body part and cannot be released.

In an example, movement of the handle from the closed position to the open position comprises a pivotal motion of the hand grasping part with respect to the body part. An angle between the hand grasping part and the body part in the open position is greater than an angle between the hand grasping part and the body part in the closed position. This is clearly shown for example in FIG. 3.

In an example, when the handle is in the open position the hand grasping part is configured to be rotated with respect to the body part to open the door of the compartment. This is clearly shown for example in FIG. 3.

In an example, when the handle is in the open position the hand grasping part is configured to be rotated with respect to the body part to unlock the door of the compartment.

In an example, activation of the lock when the handle is in the closed position comprises a lock pin being pushed into the body part of the handle from the rear side of the handle. Thus, a coupling system linked to the active element can move when the active element has been set to a state that is dangerous or potentially dangerous, and this movement can be coupled to move the lock pin into the body part of the handle to lock the handle such that the handle cannot be transitioned to the open position. That locking can comprise locking the hand grasping part from not being able to move, for example.

In an example, in the closed position a transition of the active element of the switchgear from the active or potentially state to the quiescent state is configured to de-activate the lock. De-activation of the lock is configured to enable the handle to move from the closed position to the open position.

In an example, the handle comprises a status pin. A movement of the handle from the closed position to the open position is configured to move the status pin to a first position. The status pin is shown as the bottom pin in FIG. 2 and as the top pin in FIG. 3, with FIG. 3 showing one example of movement of the status pin when the handle is transitioned from a closed position to an open position—and other words viewing the second and third images of FIG. 3 in reverse.

In an example, movement of the status pin to the first position is configured to place the active element of the switchgear in the quiescent state.

In an example, a movement of the handle from the open position to the closed position is configured to move the status pin to a second position.

In an example, movement of the status pin to the second position is configured to enable the active element of the switchgear to enter the active or potentially active state.

In an example, the handle comprises a slider that in a first position is configured to lock to a part of the switchgear when the door of the switchgear is fully closed and wherein in the first position of the slider the status pin is able to move, and wherein in a second position of the slider the slider is configured to be unlocked from the part of the switchgear and wherein in the second position of the slider the status pin is stopped from moving from the first position, and wherein when the status pin is stopped from moving from the first position the handle is configured such that the handle cannot move from the open position to the closed position. The slider is shown in FIG. 4, where when the slider has moved to engage a door pin and lock the door to the frame of the cabinet, the slider has moved to a position where the status pin, here termed the two diameter pin, can move inwards and outwards through the hole are shown in the right hand image. However, when the slider has moved to disengage with the door pin, the status pin is held in position as shown in the left-hand image.

In an example, in the closed position the hand grasping part is positioned such that a human user cannot grasp the hand grasping part. This is shown in the 2 right-hand images of FIG. 3.

In an example, in the closed position the hand grasping part is positioned at least substantially within the body part.

An example of a low, medium or high voltage switchgear comprises a compartment, a door, a handle as described above, and an active element. The door permits access to the inside of the compartment. The handle is used to open and close the door. The active element is located in the compartment.

An example of the new handle for a compartment of a low, medium or high voltage switchgear comprises a body part, a hand grasping part, a status pin. The handle is configured to move from a closed position to an open position. When the handle is in the closed position it is not useable to open a door of a compartment of a switchgear. When the handle is in the open position it is useable to open the door of the compartment of the switchgear. In the open position the hand grasping part is positioned such that a human user can grasp the hand grasping part. A movement of the handle from the closed position to the open position is configured to move the status pin to a first position. Movement of the status pin to the first position is configured to place an active element of the switchgear in a quiescent state.

In an example, movement of the handle from the closed position to the open position comprises a pivotal motion of the hand grasping part with respect to the body part. An angle between the hand grasping part and the body part in the open position is greater than an angle between the hand grasping part and the body part in the closed position.

In an example, when the handle is in the open position the hand grasping part is configured to be rotated with respect to the body part to open the door of the compartment.

In an example, when the handle is in the open position the hand grasping part is configured to be rotated with respect to the body part to unlock the door of the compartment.

In an example, movement of the handle from the closed position to the open position is configured to enable the status pin to move into the body part of the handle under for example spring driven motion from the rear side of the handler. Thus, this mechanical movement can be linked to the coupling system and linked to the active element to render the active element safe by setting it into a quiescent state.

In an example, a movement of the handle from the open position to the closed position is configured to move the status pin to a second position. Movement of the status pin to the second position is configured to enable the active element of the switchgear to enter an active or potentially active state.

In an example, movement of the handle from the open position to the closed position is configured to move or push the status pin to away from and out of the body part of the handle from the rear side of the handle and into the compartment. Thus, this mechanical movement can be linked to the coupling system and linked to the active element to set the active element into a state that is potentially dangerous.

In an example, the handle comprises a slider that in a first position is configured to lock to a part of the switchgear when the door of the switchgear is fully closed and wherein in the first position of the slider the status pin is able to move, and wherein in a second position of the slider the slider is configured to be unlocked from the part of the switchgear and wherein in the second position of the slider the status pin is stopped from moving from the first position, and wherein when the status pin is stopped from moving from the first position the handle is configured such that the handle cannot move from the open position to the closed position. The slider has been described above with reference to the FIGS. 2-4.

In an example, the handle comprises a lock, and when in the closed position a transition of the active element in the compartment of the switchgear from the quiescent state to an active or potentially active state is configured to activate the lock. Activation of the lock is configured to stop the handle from moving from the closed position to the open position.

In an example, in the closed position a transition of the active element of the switchgear from the active or potentially state to the quiescent state is configured to de-activate the lock. De-activation of the lock is configured to enable the handle to move from the closed position to the open position.

In an example, in the closed position the hand grasping part is positioned such that a human user cannot grasp the hand grasping part.

In an example, in the closed position the hand grasping part is positioned at least substantially within the body part.

An example of a low, medium or high voltage switchgear comprises a compartment, a door, a handle as described above and an active element. The door permits access to the inside of the compartment. The handle is used to open and close the door. The active element is located in the compartment.

The handle for a low, medium or high voltage switchgear and a low, medium or high voltage switchgear having such a handle are discussed in further details, where again reference is made to the figures.

FIG. 2 shows an example of the new handle. The handle has a body portion and hand grasping portion, and when the hand grasping portion (also called the handle lever in FIG. 2) is located within the body portion (also called handle housing in FIG. 2) the hand grasping portion cannot be grasped by human hand. A normal key driven lock can be used to lock the handle such that the handle lever is held within the body portion. When the key driven lock is open and the handle is not locked, a button is then pressed and the spring releases the handle lever from the body portion. However, in addition to the key driven lock there is another lock functionality of the handle, activated through the release lock pin. The release lock pin is pushed into the body portion of the handle if an active element within the compartment of the switchgear has entered a state such that it can now be activated, and to enter the compartment would be dangerous. Linkage or coupling system is utilised coupled to the active element, such as circuit breaker, that couples to the release lock pin and pushes the release lock pin into the handle and locks the handle in the closed position. Then, pushing the button does not release the handle lever. Thus, in effect an interlock system of the switchgear is linked to the handle and locks the handle if required. The handle also has a status pin, which provides the status of the handle to for example internal interlock systems of the compartment of the switchgear. For example, when the handle lever is moved from the open position to the closed position where it is located within the body portion, the status pin is pushed outwards and into the compartment. This is shown in more detail in FIG. 3, which as described above shows the handle of FIG. 2 rotated through 180°. The status pin can then be used for this movement to couple to mechanical coupling system that then links to the active element. Thus, when the door is closed and handle is in the closed position the active element can be provided with mechanical information that enables it to be transitioned to an active, potentially dangerous state. Conversely, when the handle lever is pulled out of the body portion of the handle, a spring mechanism pushes the status pin into the body portion of the handle and again through mechanical coupling mechanical indication is given to the active element, such as circuit breaker in the compartment, and the active element is then placed into a safe state.

Thus, FIG. 3 shows more detail of an example of the new handle used in the new interlocking system. The left-hand figure shows the handle having been operated to open the door to the compartment. The door is therefore unsecured, and the handle is unlocked. However, the interlock system has ensured that the circuit breaker (CB) or earthing switch (ES) are locked and can't be operated. The second figure from the left is indicative of the door having been closed (secured), however the handle is in an un-closed and unlocked state. Again, the interlock system has ensured that the circuit breaker or earthing switch are locked and can't be operated. In the third from left figure, the handle is in a closed state but has not yet been locked. The circuit breaker or a switch have now been placed in unlocked states by the interlock system, and can be operated. As shown in the figure closing of the handle activated a pushrod connected to a coupling system of the interlock system that led to the circuit breaker or earthing switch becoming unlocked, and where they can be activated or operated. The right-hand figure, shows the handle in the closed state but now the handle has been locked and cannot be opened. What has occurred is that an active element within the switchgear has entered a state that could be considered dangerous, for example a circuit breaker has been racked to a position where it can now operate, and this has activated a coupling system which has led to a pushrod being pushed into the handle and that has then locked the handle.

Thus the individual figures of FIG. 3 show the stages of handle operation. The interlocking system has in effect separated the motion of closing and securing the door against internal arc and the unlocking the interlock. The interlocking system takes information from the handle and only after the door is properly secured (today interlocking takes information only from door position itself—not connected to the handle in any way). Another feature of the new interlocking and new safety handle is that the interlocking system blocks opening of the door by blocking the handle and not the door itself.

An additional problem can arise, where if the doors are not closed enough (are not pushed enough against the switchgear) the slider inside the door can hit the door pins. Because closing switchgear door usually requires applying some force, an operator by thinking that all is ok, will apply a larger force than necessary and damage the inner parts of an existing handle. That would mean that the swing motion of the handle is compromised, and the door seems to be properly secured. A problem is that the door sliders are only partially in contact with door pins and this can lead to an unsafe situation. FIG. 4 shows a slider of the handle, where a keyhole is provided in the door slider and the two-diameter pin (the status pin of the handle as discussed previously). The result will be that the handle is be able to "click in" only if the slider reached its final position and is safe to continue with another operation.

The new handle and low, medium or high voltage switchgear with such handle prevents dangerous situations from happening.

Information is provided from and received by the handle and not just the door that can then be utilised within an interlocking system. Doors are protected against internal arc via the new safety handle before the interlock can be unlocked. Also the safety handle is blocked and hidden, and excessive force can't be applied, and not just the slider inside the door. This is different to the door handle of today that is always accessible for touch and operation, even if the door is blocked.

The following provides a brief summary is to example of how the new handle finds utility, for a circuit breaker compartment and door. Initially the circuit breaker is unlocked and in a test position, with the door open, and the handle released and rotated to an open position. The door is then closed and handle is rotated to a position where it can be closed. The circuit breaker is locked in a test position. The handle is then fully closed by pushing the handle lever into the body portion, and a circuit breaker lock is released due to movement of the status pin. The circuit breaker is then racked into a service position, and the door handle is locked via movement of the release lock pin that occurred due to the racking of the circuit breaker into the service position. The circuit breaker is therefore in a service position, the door is closed and locked, and the handle is locked and cannot be used to open the door. Thus, the safety associated with operation of a circuit breaker has been increased significantly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A low, medium, or high voltage switchgear, comprising:
   a compartment;
   a door permitting access to an inside of the compartment;
   an active element disposed inside the compartment; and
   a handle for opening and closing the door, the handle comprising:
      a body part;
      a hand grasping part; and
      a lock,
   wherein the handle is configured to move from a closed position to an open position,
   wherein, when the handle is in the closed position, the handle is not useable to open the door,
   wherein, when the handle is in the open position, the handle is useable to open the door,
   wherein, in the open position, the hand grasping part is positioned so as to be graspable by a human user,
   wherein, in the closed position, a transition of the active element from a quiescent state to an active or potentially active state is configured to activate the lock,
   wherein activation of the lock is configured to stop the handle from moving from the closed position to the open position,
   wherein the handle comprises a status pin, a movement of the handle from the closed position to the open position being configured to move the status pin to a first position, and
   wherein a movement of the status pin to the first position is configured to place the active element in the quiescent state.

2. The switchgear of claim 1, wherein, in the closed position, a transition of the active element of the switchgear from the active or potentially state to the quiescent state is configured to de-activate the lock, and
  wherein de-activation of the lock is configured to enable the handle to move from the closed position to the open position.

3. The switchgear of claim 1, wherein the movement of the handle from the open position to the closed position is configured to move the status pin to a second position.

4. The switchgear of claim 3, wherein movement of the status pin to the second position is configured to enable the active element of the switchgear to enter the active or potentially active state.

5. The switchgear of claim 1, further comprising:
  a slider that in a first position is configured to lock to a part of the switchgear when the door of the switchgear is fully closed,
  wherein, in the first position of the slider, the status pin is movable,
  wherein, in a second position of the slider, the slider is configured to be unlocked from the part of the switchgear,
  wherein, in the second position of the slider, the status pin is stopped from moving from the first position, and
  wherein, when the status pin is stopped from moving from the first position, the handle is configured such that the handle is not movable from the open position to the closed position.

6. The switchgear of claim 1, wherein, in the closed position, the hand grasping part is positioned so as to not be graspable by the human user.

7. The switchgear of claim 6, wherein, in the closed position, the hand grasping part is positioned at least substantially within the body part.

8. A low, medium, or high voltage switchgear, comprising:
  a compartment;
  a door permitting access to an inside of the compartment;
  an active element disposed inside the compartment; and
  a handle for opening and closing the door, the handle comprising:
    a body part;
    a hand grasping part; and
    a status pin,
  wherein the handle is configured to move from a closed position to an open position,
  wherein, when the handle is in the closed position, the handle is not useable to open the door,
  wherein, when the handle is in the open position, the handle is useable to open the door,
  wherein, in the open position, the hand grasping part is positioned so as to be graspable by a human user,
  wherein a movement of the handle from the closed position to the open position is configured to move the status pin to a first position,
  wherein a movement of the status pin to the first position is configured to place the active element of the switchgear in a quiescent state,
  wherein the handle comprises a lock where, when in the closed position, a transition of the active element from the quiescent state to an active or potentially active state is configured to activate the lock, activation of the lock being configured to stop the handle from moving from the closed position to the open position, and
  wherein, when the lock is in the closed position, a transition of the active element from the active or potentially active state to the quiescent state is configured to de-activate the lock, de-activation of the lock being configured to enable the handle to move from the closed position to the open position.

9. The switchgear of claim 8, wherein a movement of the handle from the open position to the closed position is configured to move the status pin to a second position, and
  wherein movement of the status pin to the second position is configured to enable the active element of the switchgear to enter an active or potentially active state.

10. The switchgear of claim 8, further comprising:
  a slider that in a first position is configured to lock to a part of the switchgear when the door of the switchgear is fully closed,
  wherein, in the first position of the slider, the status pin is able to move,
  wherein, in a second position of the slider, the slider is configured to be unlocked from the part of the switchgear,
  wherein, in the second position of the slider, the status pin is stopped from moving from the first position, and
  wherein, when the status pin is stopped from moving from the first position, the handle is configured such that the handle is not movable from the open position to the closed position.

11. The switchgear of claim 8, wherein, in the closed position, the hand grasping part is positioned so as to not be graspable by the human user.

12. The switchgear of claim 11, wherein, in the closed position, the hand grasping part is positioned at least substantially within the body part.

* * * * *